United States Patent
Badovinac

[11] 3,762,307
[45] Oct. 2, 1973

[54] FLAVOR CUP

[76] Inventor: Peter Badovinac, 4069 Dilly Ave., Cleveland, Ohio 44127

[22] Filed: Mar. 2, 1972

[21] Appl. No.: 231,193

[52] U.S. Cl. .................................. 99/532, 99/345
[51] Int. Cl. ...................... A23b 1/16, A47j 43/16
[58] Field of Search ................. 99/345, 346–347, 99/494, 532–533, 534–535, 536; 206/DIG. 18; 220/53, 44 R; 241/168

[56] References Cited
UNITED STATES PATENTS

| | | | |
|---|---|---|---|
| 1,661,595 | 3/1928 | Bowen | 99/532 |
| 2,670,673 | 3/1954 | Gordon et al. | 99/532 X |
| 3,022,721 | 2/1962 | Vath | 99/345 |
| 3,281,024 | 10/1966 | Henchert et al. | 220/53 X |
| 3,410,457 | 11/1968 | Brown | 99/532 X |
| 3,441,980 | 5/1969 | Defenbaugh | 99/532 X |
| 3,483,810 | 12/1969 | Peters et al. | 99/532 |
| 3,530,785 | 9/1970 | Peters et al. | 99/532 |
| 3,581,651 | 6/1971 | Johnson | 99/535 |
| 3,590,722 | 7/1971 | Leptrone | 99/532 |

FOREIGN PATENTS OR APPLICATIONS

| | | | |
|---|---|---|---|
| 3,705 | 10/1902 | Great Britain | 99/345 |
| 130,857 | 5/1902 | Great Britain | 99/345 |

Primary Examiner—Harvey C. Hornsby
Assistant Examiner—Arthur O. Henderson

[57] ABSTRACT

A device for impregnating a meat with liquid flavoring or other fluid so to improve its taste, the device consisting of a container having a series of downward projections on its underside, each projection being hollow and communicating with the interior of the container, the outer end of the projections being open so that the flavoring or fluid can be dispensed from the projections after they pierce into the meat.

1 Claim, 6 Drawing Figures

PATENTED OCT 2 1973
3,762,307
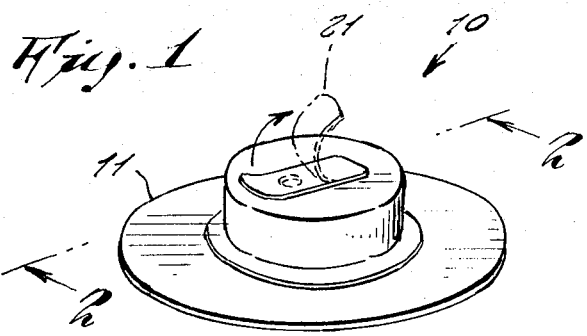
Fig.1
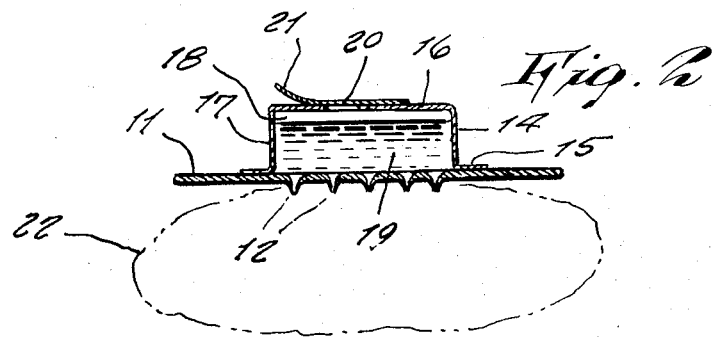
Fig.2
Fig.3
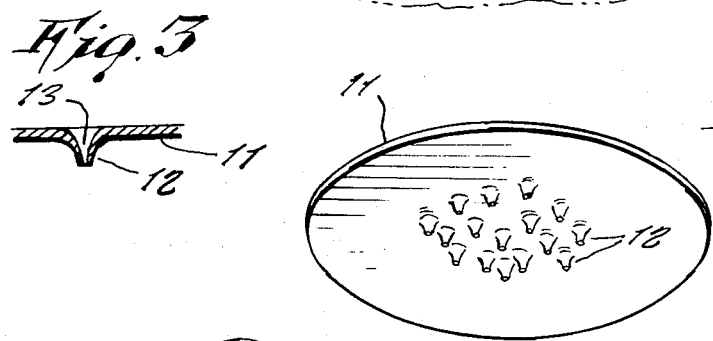
Fig.4
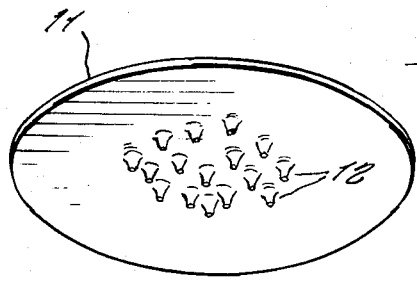
Fig.5
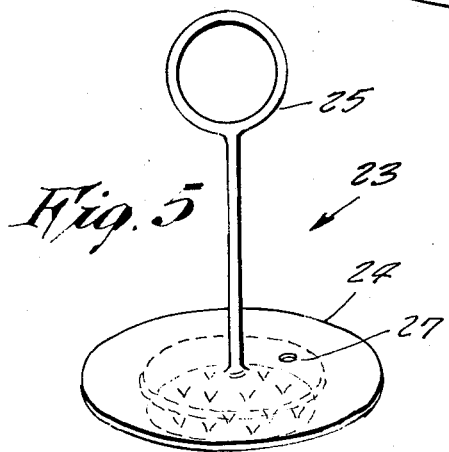
Fig.6
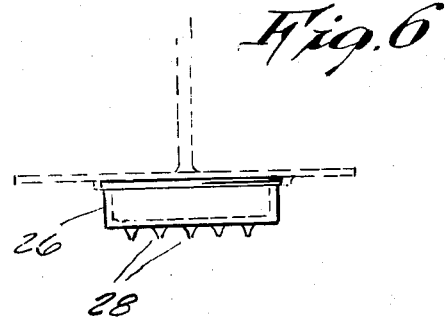

FLAVOR CUP

This invention relates generally to cooking accessories.

A principal object of the present invention is to provide a flavor cup for injecting flavoring or other fluid into meat so to improve its taste.

Another object is to provide a flavor cup which is designed to inject flavoring through the outer side of the meat and into the interior thereof.

Another object is to provide a flavor cup which can be made either for single use and disposal thereof afterwards or which can be designed for permanent re-use.

Other objects are to provide a flavor cup which is simple in design, inexpensive to manufacture, rugged in construction, easy to use, and efficient in operation.

These and other objects will be readily apparent upon a study of the following specification and the accompanying drawing, wherein:

FIG. 1 is a top perspective view of a single use type of flavor cup.

FIG. 2 is a cross-sectional view on line 2—2 of FIG. 1.

FIG. 3 is an enlarged detail of one of the projections shown in FIG. 2.

FIG. 4 is a bottom perspective view of the flavor cup shown in FIG. 1.

FIG. 5 is a perspective view of a permanent re-use type of the invention.

FIG. 6 is a side view thereof shown fragmentarily.

Referring now to the drawing in detail and more particularly at this time to FIGS. 1 to 4, the reference numeral 10 represents flavor cup according to the present invention wherein there is a circular stiff base disc 11 having a series of hollow, downward tapering projections 12 that have openings 13 therethrough. The disc is preferably molded of plastic material for reasons of low cost and sanitary maintenance.

A hollow shell 14 made of formed thin aluminum foil is centrally secured on the disc either suitable adhesive or heat seal under a flange 15 of the shell. The shell includes a flat top wall 16 and circular side wall 17 that enclose a central compartment 18 in which flavor fluid 19 is contained. An air vent hole 20 through top wall 16 is originally kept closed by a pull-off tab 21.

When it is desired to add flavor fluid to a hamburger 22, a person pulls off the pull tab so that air may enter chamber 18 so to allow the fluid to seep out of the projection openings 13 and into the hamburger. The flavor cup can be made of a size so that it is for a single use, after which it is disposed. To prevent seepage, the projection tips may be coated with a tiny edible tallow so to close the opening 13, and which melts when the projections are pushed into a hot hamburger so to allow the flavor fluid to pour out.

In FIGS. 5 and 6 a modified design 23 of the invention is shown which is of permanent type for re-use. It includes disc 24 with upstanding handle 25, the underside of the disc being adaptable for a hollow container 26 to be secured thereto, such as by a press fit or screw thread. The disc includes a vent hole 27, and the container includes the hollow projections 28 as above described. The parts are of any suitable materials such as metal or plastic so to remain re-usable permanently. The container is refilled from a supply bottle of flavor fluid when intended to be used. The container 26 is open on top for easy refilling. Alternately, containers 26 may be retailed as replaceable fully closed units that are attachable to the disc 24 after being vented.

While various changes may be made in the detail construction, it is understood that such changes will be within the spirit and scope of the present invention as is defined by the appended claims.

I claim:

1. In a flavor cup, the combination of a unit containing flavor fluid for improving the taste of meats, and means to impregnate said meat with said fluid, said unit including a stiff disc and a shell so to form a container for said flavor fluid, an underside of said container having a series of hollow downward projections with openings therethrough so to dispense said flavor fluid, said projections being coated with edible tallow to prevent seepage of said fluid prior to time of intended use, said tallow melting when said projections are pushed into a hot hamburger so to allow said fluid to flow out, an air vent opening being provided through a top of said container to allow flow of said flavor fluid, said container being of re-use type.

* * * * *